United States Patent Office 2,974,137
Patented Mar. 7, 1961

2,974,137

N⁴-(BENZ- OR ANISYLIDENE)-N¹-(6-METHOXY-3-PYRIDAZINYL)-SULFANILAMIDES

Gilmer T. Fitchett, Dunellen, John E. Gordon, Middlesex, and Robert G. Shepherd, Ridgewood, N.J., assignors to American Cyanamid Company, New York, N.Y., a corporation of Maine No Drawing. Filed Feb. 3, 1958, Ser. No. 712,682

4 Claims. (Cl. 260—239.7)

This invention relates to a process of preparing $N^1$-acylsulfanilamido heterocycles and $N^1$-acylsulfanilamides.

Many sulfa drugs of the sulfanilamido heterocycle type have an objectionable bitter taste, which makes their oral administration unpleasant and less satisfactory. A particularly important sulfa drug which exhibits an especially objectionable bitter taste is 3-sulfanilamido-6-methoxypyridazine. Other sulfa drugs of interest include sulfaethylthiadiazole and sulfapyrimidines.

It is known that the $N^1$-acyl derivatives and particularly the $N^1$-lower alkanoyl compounds such as the $N^1$-formyl, acetyl and propionyl derivatives in general do not have the objectionable strongly bitter taste or have it to a very much lesser degree. For the most part these $N^1$-acyl derivatives retain substantially the therapeutic activity of the parent drug.

In spite of the very real advantages in using the $N^1$-acyl derivatives, they have not achieved the wide acceptance that their improved properties would warrant because of the extreme difficulty of preparing some of these compounds, which has resulted in a cost so high that their practical utilization has been seriously limited.

Direct acylation of the parent sulfa drugs is in general not practical because of the presence of the amino group which is also readily acylated and the tendency to form $N^1$, $N^4$ diacylates.

It has been proposed in the case of preparation of $N^1$-acyl-3-sulfanilamido-6-methoxypyridazine to block off the $N^4$ nitrogen by reaction with carbobenzoxy chloride. The $N^1$ group is then acylated and the carbobenzoxy group removed by catalytic hydrogenation or other reduction procedures. This constituted a great step forward in the preparation of $N^1$-acylsulfamethoxypyridazine, but still is not ideal as the method is complicated, requires a number of steps and there is some loss in yield. The net result is a cost which is still high enough to constitute a limitation on the field of use.

According to the present invention, it has been found that an extremely simple and cheap process of preparing the desired $N^1$-acyl derivatives can be effected by reacting the $N^4$ amino group with an aromatic aldehyde such as benzaldehyde, tolualdehyde, anisaldehyde, and the like to form an anil. The $N^4$-aralkylidine sulfa drug is then acylated at the $N^1$ position by acylation procedures which are quite simple, using the corresponding anhydride, in the presence of a suitable antacid liquid heterocyclic tertiary amine base, such for example as pyridine, picoline and the like. After acylation, the removal of the aralkylidene group can be effected simply by adding some water to the reaction mixture after acylation is complete and gently heating to hydrolyze off the aralkylidene group and regenerate the $N^4$ amino group. The addition of further water then causes a precipitation of the desired $N^1$-acyl product which can be recovered by conventional filtration. The sequence of reactions is shown schematically as follows for 3-sulfanilamido-6-methoxypyridazine.

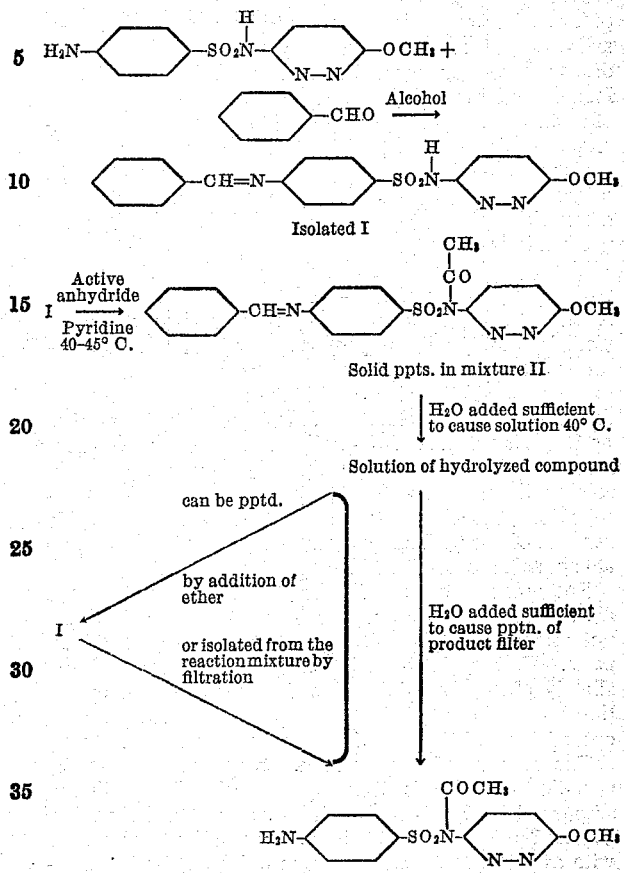

The differential hydrolysis of the aralkylidene group which constitutes the process heart of the present invention is surprising and the reasons for the almost complete selectivity are not known. It is not desired to limit the invention to any particular theory or reaction mechanism. That it would be possible under sufficiently drastic conditions to hydrolyze off the aralkylidine group is, of course, known to every chemist. However, these are precisely the type of reaction conditions which are also known to effect hydrolysis of an acyl group on an $N^1$ nitrogen. The surprising thing is that the very conditions which normally effect hydrolysis of both types of groups in the present cases hydrolyze one without any substantial hydrolysis of the other.

The new process permits formation of pure $N^1$-acyl sulfa drugs in good yield and with a simple process in which most of the steps are effected without isolating any material from the reaction mixture. It is thus possible for the first time to produce $N^1$-acyl sulfa drugs such as $N^1$-acyl sulfamethoxypyridazine at a cost only a little above that of the sulfa drug itself, and a wide field of use is thus assured because at slight additional cost the improved products, with no bitter taste, are obtainable.

Some of the $N^4$-aralkylidene compounds are new chemical compounds and are claimed as such. It is also of interest that these compounds do not have the objectional bitter taste and even in some cases, such as the anisylidene compounds, have pleasant flavors. The compounds are in general therapeutically active, although frequently not as active as the $N^1$-acyl sulfa drugs. However, their activity is sufficiently high so that in some cases they constitute useful therapeutic compounds, as well as being intermediates useful in the present process for the production of the $N^1$-acyl products. When it is desired to isolate the aralkylidene compounds, this may be effected easily from the aqueous reaction medium by precipitation with various organic liquids, such as ether.

Further advantages of the invention are that the various steps do not require elaborate equipment or procedure. For example, the formation of the anil by reaction of the aromatic aldehyde with the original sulfa drugs proceeds simply and easily in an alcoholic medium. Isolation of the anil is also simple and the acylation is effected at very moderate temperature, for example 40–45° C. with good yield. The temperature of hydrolysis is also very moderate, about 40° C., although in no sense critical, and the isolation with further additions of water takes place simply and easily, producing a very pure product in excellent yield.

The acylation can be effected over a very wide range of temperatures, from about $-15°$ C. to 60° C. Since the reaction at the lower temperatures is quite slow and the yield is substantially as good at about 40° C., temperatures in this general range are preferred. The amount of the lower aliphatic acid anhydride used is also not critical. It may range from stoichiometrical amounts to as much as 10 parts per part of $N^4$-aralkylidene sulfa drug. There is some advantage in operating slightly above the absolute minimum, as easier control of the reaction results. In general, a range of from 0.6 part of anhydride per part of aralkylidene to equal parts constitutes a desirable practical operating range.

The amounts of antacid, for which as is pointed out above, the liquid heterocyclic bases are suitable, is also not critical. In general, it ranges from 2 parts to 50 parts. Here again, there is some advantage in operating slightly above the minimum and so for practical operation a range of from about 3.5 to 6 parts gives excellent operating conditions and does not result in excessive cost.

The amount of water which has to be added to the acylation mixture is likewise not critical. Minimum amounts less than 1/10 part per part are not fully effective and the hydrolysis will proceed satisfactorily even with as much as 10 parts of water. The hydrolysis temperature can vary from 0 to 60° C., but may be advantageously in the 40's to obtain rapid reaction with simple control. Final precipitation can be effected with the addition of from 2 to 50 parts of water, but for practical operating procedures, 1 or 2 parts of water for the hydrolysis and from 10 to 15 parts of water for precipitation give excellent results.

The invention will be further illustrated in the following specific examples in which the parts are by weight, unless otherwise specified.

Example 1

70 parts of a mixture of 3-sulfanilamido-6-methoxypyridazine and 550 parts of anhydrous ethanol was heated to reflux. To the slurry was then slowly added 50 parts of benzaldehyde. Within a short time, a few minutes, a complete solution resulted, and the temperature was maintained at 70—78° with agitation until the reaction was complete. In a few minutes the product started to crystallize. The slurry was cooled to about 20° C. and a solid product was removed by filtration and washed with anhydrous ethanol and dried. A high yield of $N^4$-benzylidene-3-sulfanilamido-6-methoxypyridazine resulted.

Example 2

A mixture of 980 parts of pyridine and 162 parts of acetic anhydride was heated to 40° C. 250 parts of the product of Example 1 was then added, the temperature being maintained between 40 and 45° C. After the addition was completed, agitation was continued until reaction was complete. Precipitation of solid material started early and after cooling the mixture to 25° C., 250 parts of water was added. The temperature of the slurry rose to 46° C. and complete solution resulted in a short time. The solution was maintained at 40° C. until hydrolysis of the benzylidene group was complete and it was then cooled to 30° C. 2100 parts of water was then added, which precipitated the product after cooling to 20° and short agitation. The solid product was removed by filtration, washed pyridine free and dried, giving a good yield of $N^1$-acetyl-$N^1$-(6-methoxy-3-pyridazinyl)-sulfanilamide.

Example 3

The procedure of Example 1 was repeated except that the benzaldehyde was replaced by an equivalent amount of anisaldehyde. An excellent yield of $N^4$-anisylidene sulfamethoxypyridazine was obtained.

Example 4

The procedure of Example 2 was repeated substituting the product of Example 3 for that of Example 1. A good yield of $N^1$-acetyl-$N^1$-(6-methoxy-3-pyridazinyl)-sulfanilamide was obtained.

Example 5

To 100 parts of pyridine and 15 parts of acetic anhydride, heated to 40–45° C., 25 parts of $N^4$-benzylidene sulfamethoxypyridazine was added. The mixture was stirred at 45° C. and complete solution occurred. In 5–10 minutes, a precipiate formed and the heating at 45° was continued for 1 hour. The slurry was cooled to 15° C. and 850 parts of diethyl ether was added to the slurry. The slurry was cooled to 0° C., the crystals ioslated by filtration and dried to constant weight and a 90.5% yield of the expected product was obtained. The melting point was 201.5–202.9° C. and the microanalytical results agreed very well with the values calculated for $N^1$-acetyl-$N^4$-benzylidene sulfamethoxy pyridazine.

Example 6

To 60 parts of pyridine was added 12 parts of $N^4$-p-methoxybenzylidene sulfamethoxy pyridazine. Then 5 parts of acetic anhydride was charged and the mixture was agitated for 1 hour and a precipitate formed. Then 10 parts of water was added, the precipitate dissolved, and the mixture was agitated for 1 hour. Addition of 150 parts of water precipitated the product and the slurry was stirred for a ½ hour. The product was filtered off, washed and dried. A 77.3% yield of the $N^1$-acetyl sulfamethoxy pyridazine was obtained.

We claim:
1. $N^4$-benzylidene-$N^1$-(6-methoxy-3-pyridazinyl)-sulfanilamide.
2. $N^4$-benzylidene-$N^1$-acetyl-$N^1$-(6-methoxy-3-pyridazinyl)-sulfanilamide.
3. $N^4$-anisylidene-$N^1$-(6-methoxy-3-pyridazinyl)-sulfanilamide.
4. $N^4$-anisylidene-$N^1$-acetyl-$N^1$-(6-methoxy-3-pyridazinyl)-sulfanilamide.

References Cited in the file of this patent

UNITED STATES PATENTS

| | | |
|---|---|---|
| 2,393,271 | Shelton | Jan. 22, 1946 |
| 2,891,949 | Webb et al. | June 23, 1959 |

FOREIGN PATENTS

| | | |
|---|---|---|
| 541,958 | Great Britain | Jan. 15, 1942 |

OTHER REFERENCES

Kolloff et al.: J. of the Am. Chem. Soc., vol. 62, pp. 158–159 (1940).

Northey: The Sulfonamides and Allied Compounds, Reinhold Pub. Co., N.Y., pp. 37–39 (1948).